United States Patent Office 2,947,190
Patented Aug. 2, 1960

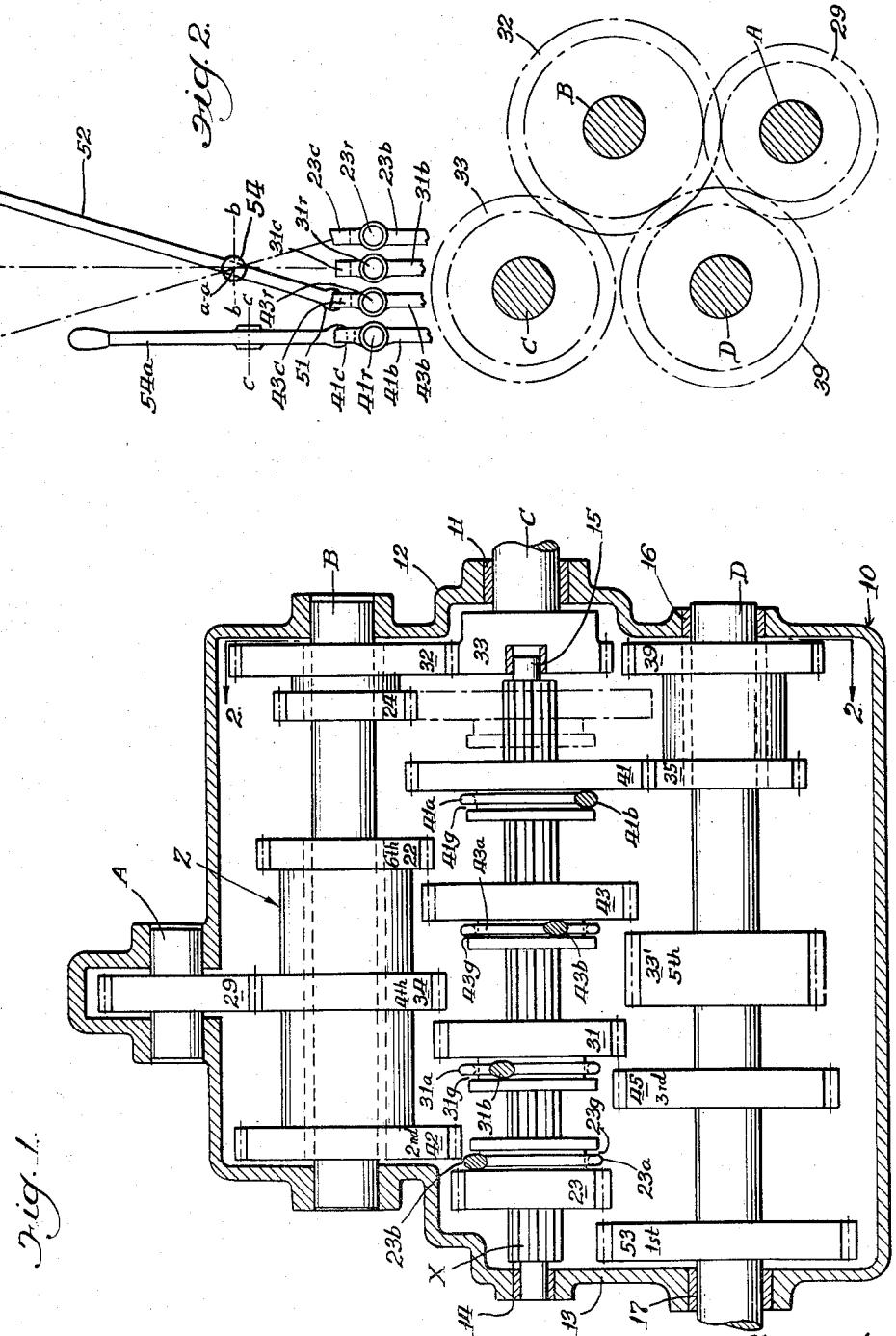

2,947,190

POWER TRANSMISSION GEARING WITH SPEED CHANGE IN FORWARD AND REVERSE DRIVE

Robert W. Johnson, Elmhurst, Ill., assignor to International Harvester Company, Chicago, Ill., a corporation of New Jersey Filed July 14, 1958, Ser. No. 748,231

5 Claims. (Cl. 74—342)

This invention relates to change-speed transmissions of the countershaft type, and more particularly concerns a novel compact and efficient arrangement of the shafting and gears of a transmission to obtain multi-speed drive both in forward and reverse directions.

The present invention is particularly useful in transmissions for tractors of industrial or agricultural type, utilizing change-speed gearing between the vehicle engine and the vehicle traction wheels to enable the traction wheels to be driven at a plurality of speeds either forwardly or rearwardly with respect to constant speed and direction of drive of the engine.

An important object of the invention is the provision of a change-speed gearing transmission having such an arrangement of shafting and gears that a relatively great number of speeds both forward and reverse are obtainable in a relatively small compact unit minimizing the number of gears.

A further object is the provision of improvements in change-speed transmission gearing of the above character that facilitates making the various driving connections through the transmission unit by selective alternative connections of gears upon a single shaft with gears upon other shafts of the transmission.

The above and other desirable objects inherent in and encompassed by the invention are elucidated in the ensuing description, the appended claims and the annexed drawings, wherein:

Fig. 1 is a semi-schematic layout of transmission gearing constituting a preferred form of the invention, with the various shafts displaced into a common plane to better illustrate the driving connections between the various gears.

Fig. 2 is an end view of the shafts and gearing of the transmission unit taken at the plane indicated by the line 2—2 in Fig. 1 but showing the actual relation of the transmission shafts to one another, and also illustrating how a gear shifting lever and gear shifter forks can be associated with the transmission unit.

The drawings illustrate a preferred embodiment of the invention in the form of a transmission suitable for use upon a tractor. This transmission has six forward speeds and six reverse speeds. A casing 10 for the transmission contains a bearing 11 in its front wall 12 for a drive shaft C adapted to receive input driving force from the tractor engine (not shown). A rear end wall 13 of the casing 10 contains a bearing 14 for the rear end of a longitudinally splined intermediate shaft X having a reduced front end portion 15 piloted in the rear end of the drive shaft C.

A countershaft bearing rod B extends between and is non-rotatively mounted in the casing end walls 12 and 13. A tubular countershaft Z is rotatively mounted upon the rod B. Countershaft Z has three gears 42, 34 and 22 formed thereon. These reference characters applied to the gears on countershaft Z indicate the number of teeth upon the gears, in addition to designating the gears, this being also true with respect to the reference characters applied to the remaining gears in the transmission.

The casing 10 also supports a bearing rod A for an idler gear 29 which constantly meshes with the countershaft gear 34 and with a wide gear 33' rotatively fixed upon the driven or output shaft D journalled in bearings 16 and 17 respectively in the front casing wall 12 and the rear casing wall 13. The driven shaft also has gears 45 and 53 constrained for rotation therewith.

Intermediate shaft X has gears 23, 31, 43 and 41 splined thereto for sliding axially of the shaft while being constrained for rotation therewith. Gear 41 is shown meshed with a gear 35 of a gear cluster 35, 39 journalled for rotation upon the driven shaft D. Gear 41 is slidable out of mesh with the gear 35 forwardly into mesh with a gear 24 of a gear cluster 24, 32 rotatively journalled upon the countershaft bearing rod B, as illustrated by the dot-dash line position in Fig. 1. Gear 41 is also disposable in a neutral position between the positions for meshing with the gears 35 and 24, where the gear 41 will be connected with neither of these gears to establish a neutral or no-drive condition of the transmission. Intermediate shaft gear 43 is slidable from the disconnected position shown in Fig. 1 selectively rearwardly or forwardly for respective meshing and driving connection with the gear 33' or the gear 22. Intermediate shaft gear 31 is selectively shiftable from the disconnected portion shown in Fig. 1 rearwardly into mesh with the gear 45 or forwardly into mesh with the gear 34. Intermediate shaft gear 23 is selectively meshable with the gears 53 and 42 when slid rearwardly or forwardly respectively from the non-meshing position illustrated in Fig. 1.

Gears 41, 43, 31 and 23 have respective shifter fork receiving grooves 41g, 43g, 31g and 23g in which there are disposed shifter forks 41a, 43a, 31a and 23a having shanks 41b, 43b, 31b and 23b respectively mounted upon and depending downwardly from axially shiftable rods 41r, 43r, 31r and 23r shown in Fig. 2. These rods respectively have upwardly projecting notched lugs 41c, 43c, 31c and 23c. The notches of lugs 43c, 31c and 21c are receivable of the lower end 51 of a gear shifting lever 52 having a manually engageable knob 50 at its upper end. Lever 52 is pivotally supported within a lever carrier 54 with respect to which the lever is pivotable about a horizontal axis a—a seen as a point in Fig. 2. This enables shifting of the lever from the solid line position to any of the dot-dash line positions wherein the lower end 51 of the lever is selectively brought into engagement with the notched rail lugs 43c, 31c and 23c. While the lower end of the lever 53 is engaged with any of the lugs as 43c, it is manipulatable to pivot together with the carrier 54 therefor about a horizontal axis b—b to selectively move the engaged rod and the associated shifter fork axially of such rod to shift the gear as 43 engaged by the shifter fork selectively between its two gear engaging positions and the neutral position between the two gears at 22 and 33' with which the shiftable gear is meshable.

A forward-reverse shifter lever 54a has its lower end in the notched lug 41c of the axially movable shifter rail 41r and is manually pivotal about a fixed axis c—c to endwise move this rail and the shifter fork 41b to determine which of the three axial positions for the gear 41 is occupied.

Gear 33 formed upon the rear end of the drive shaft C constantly meshes with the gear 32 of the gear cluster 24, 32 and the gear 32 constantly meshes with gear 39 of the gear cluster 35, 39.

*Operation*

The power-receiving drive shaft constantly rotates the gear 33 constrained for rotation therewith. Gear 33 drives the gear cluster 24, 32 at all times because of the constant meshed relation between the gears 33 and 32. This gear cluster 24, 32 simply spins upon the countershaft bearing rod B. Gear 32 of the gear cluster 24, 32 meshes with and constantly drives the gear 39 to constantly spin the gear cluster 35, 39 upon the driven shaft D. It follows that gears 24 and 35 are driven at all times from the drive shaft C, but rotate in opposite directions so that when the gear 41 is meshed with the gear 35, it will drive the splined shaft X in one direction, herein considered reverse, whereas when the gear 41 is shifted forwardly into mesh with the gear 24, the shaft X will be driven in the opposite or forward direction.

Countershaft Z has a constant driving connection with the output or driven shaft D through gears 34, 29, and 33'. If the gear 23 is slid into mesh with the gear 42, or alternatively the gear 31 is slid into mesh with the gear 34, or further alternatively if the gear 43 is slid into mesh with the gear 22, the countershaft Z will be effective through the gears 34, 29 and 33' to drive the output shaft or driven shaft D respectively at second speed, fourth speed and sixth speed. These driving speed connections are conveniently indicated by the legends 2nd, 4th and 6th appearing respectively upon the gears 42, 34, and 22. If the gear 23 is slid rearwardly into mesh with the gear 53, or alternatively the gear 31 is slid rearwardly into mesh with the gear 45, or further alternatively the gear 43 is slid rearwardly into mesh with the gear 33', these gear connections will be respectively effective for driving the output shaft D at first speed, third speed and fifth speed. These driving speed connections are respectively designated by the indicia 1st, 3rd and 5th respectively on the gears 53, 45 and 33'. When the gear 41 is meshed with the gear 35, the above described six speeds will all drive the output shaft D in reverse, whereas if the gear 41 is slid forwardly into mesh with the gear 24, these six speeds will all be in the forward direction for the output shaft D. With the means shown for driving the intermediate shaft X from the drive shaft selectively in opposite directions, the gear 41 is driven slightly faster by the reverse driving gear 35 than by the forward driving gear 24, wherefore the six reverse speeds for the output shaft D will slightly exceed the six forward speeds for this output shaft.

A condition of no drive is established through the transmission unit by placing the gear 41 between the positions of meshing with the gears 35 and 24 so that it is meshed with neither of these gears. Neutral also obtains, of course, when each of the gears 23, 31 and 43 is in its neutral position shown, irrespective of the shifted position of the gear 41.

Having thus described a preferred form of the invention with the view of clearly and concisely illustrating the same, I claim:

1. A change-speed transmission comprising a drive shaft, an intermediate shaft, means for driving the intermediate shaft from the drive shaft, a driven shaft, gear means constrained for rotation with the driven shaft, a countershaft, gear means constrained for rotation with the countershaft, an idler gear constituting a driving connection between the countershaft gear means and the driven shaft gear means, and gear means constrained for rotation with the intermediate shaft and selectively meshable with the gear means on the driven shaft for driving the same at one speed and alternatively meshable with the gear means on the countershaft for selectively establishing a driving connection between the intermediate shaft through the countershaft gear means and the idler gear for driving the output shaft at a different speed.

2. The combination set forth above in claim 1, wherein the means for driving the intermediate shaft from the drive shaft constitutes means for selectively driving the intermediate shaft in either of opposite directions.

3. In a change-speed transmission, a drive shaft, an intermediate shaft, power train means for selectively driving the intermediate shaft respectively in opposite directions from the drive shaft, a driven shaft having a plurality of gears thereon, a countershaft having a plurality of gears thereon, gear means drivingly interconnecting the countershaft and said driven shaft for rotation in the same direction, and gear means constrained for rotation with the intermediate shaft and selectively establishable in driving connections with the gears on the driven shaft or in driving connections with the gears of the countershaft.

4. The combination set forth in claim 3, wherein the gear means constrained with the intermediate shaft includes at least one gear selectively drivingly connectable or disconnectable with one of the gears on the driven shaft and alternately selectively connectable or disconnectable with one of the gears on the countershaft.

5. The combination set forth in claim 3, wherein the driven shaft gears are axially spaced from one another and are arranged in axial sequence in direct order of the speed ascribable thereto at which they drive the driven shaft when driven by the intermediate shaft gear means, wherein the countershaft gears are also axially spaced from one another and are arranged in axial sequence in direct order of the speed ascribable thereto at which they are operable to drive the driven shaft when such countershaft gears are driven by the intermediate shaft gear means, wherein the ascribable speeds of the countershaft gears are staggered in numerical sequence with respect to the ascribable speeds of the driven shaft gears and the countershaft gears are disaligned with the driven shaft gears transversely of said shafts to dispose each countershaft gear axially displaced from and between the driven shaft gears of the respectively next lower and next higher ascribable speeds, and wherein the gear means constrained for rotation with the intermediate shaft includes a plurality of gears respectively axially between a driven shaft gear and the countershaft gear of next higher ascribable speed, and each intermediate shaft gear being selectively drivingly connectable with the gears between which it is disposed and also being disconnectable concurrently from both such gears.

References Cited in the file of this patent

UNITED STATES PATENTS 2,334,958     Rohkar _____ Nov. 23, 1943

FOREIGN PATENTS 473,907     Canada _____ May 29, 1951